Dec. 7, 1943.  W. I. GLADFELTER ET AL  2,335,931
COATING MACHINE
Filed Dec. 11, 1940  6 Sheets-Sheet 1
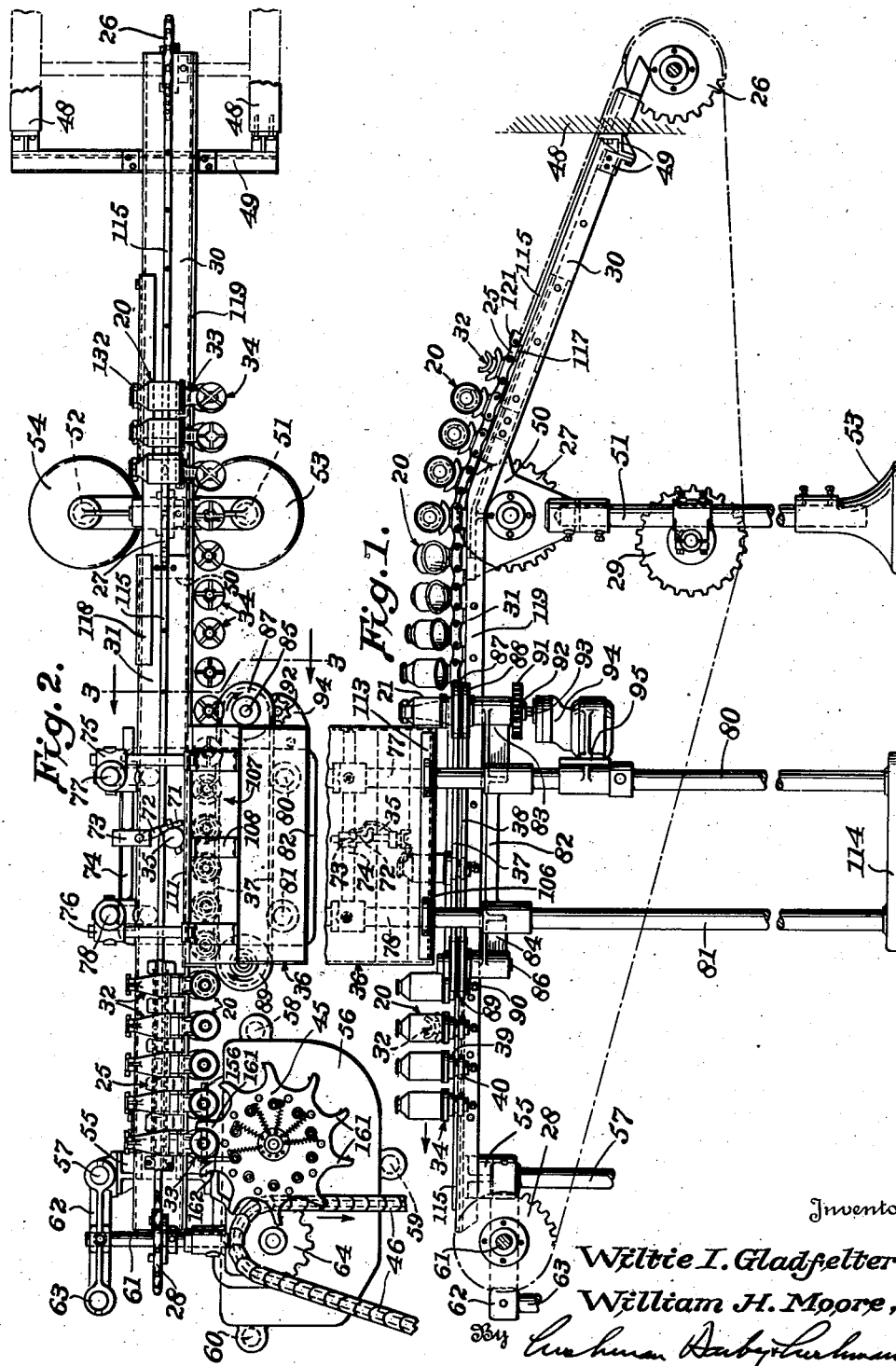
Inventors:
Wiltie I. Gladfelter,
William H. Moore,
By
Attorneys.

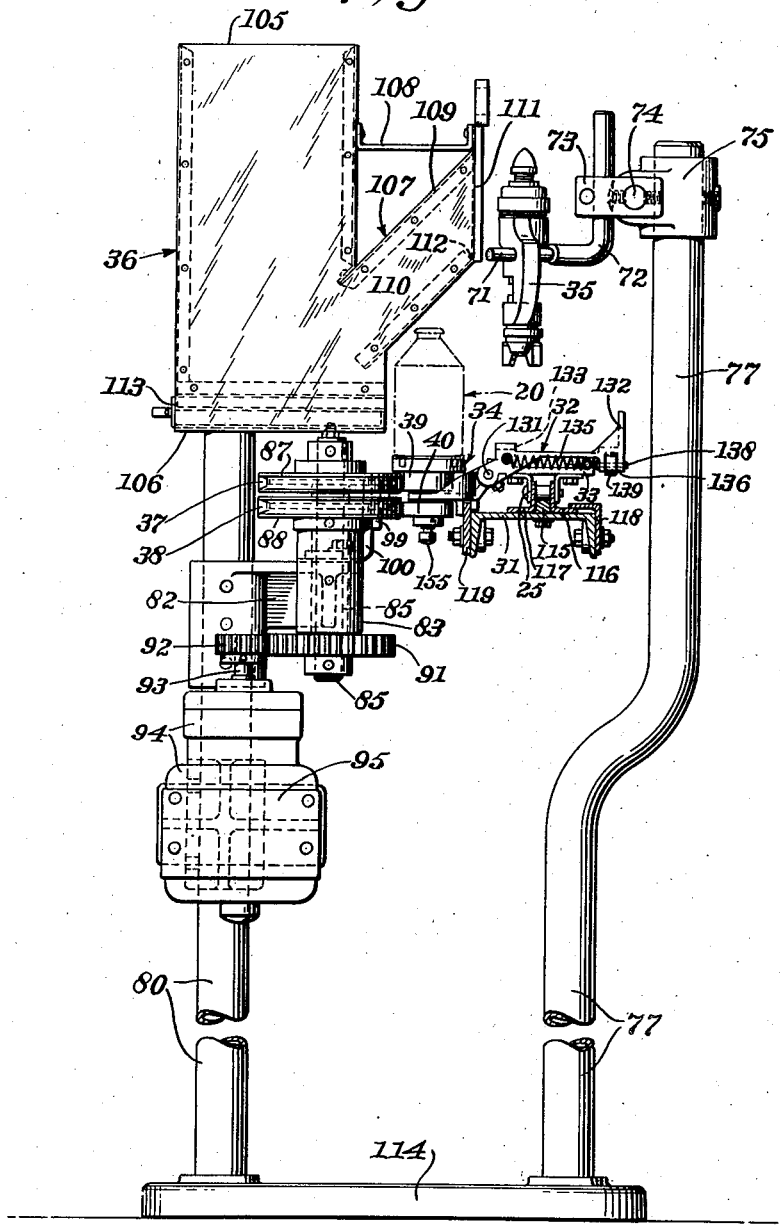

Dec. 7, 1943.   W. I. GLADFELTER ET AL   2,335,931
COATING MACHINE
Filed Dec. 11, 1940   6 Sheets-Sheet 3

Inventors:
Wiltie I. Gladfelter,
William H. Moore,
By Cushman Darby Cushman
Attorneys.

Dec. 7, 1943.   W. I. GLADFELTER ET AL   2,335,931
COATING MACHINE
Filed Dec. 11, 1940        6 Sheets-Sheet 4
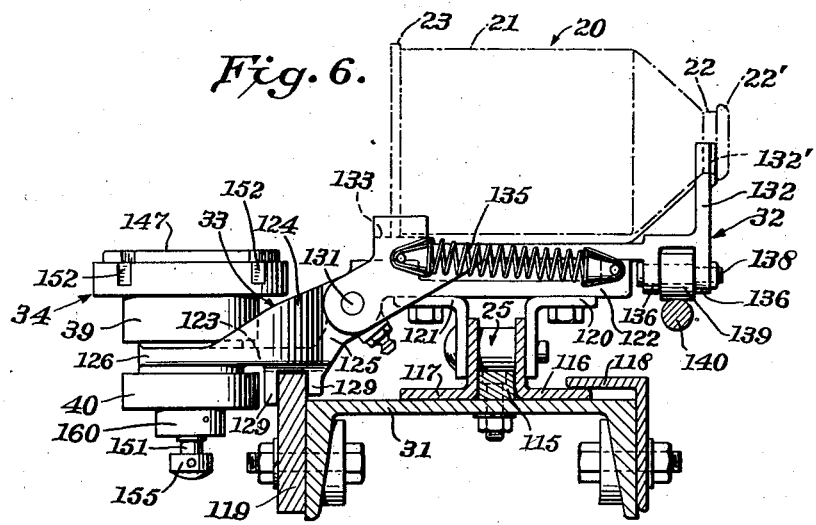
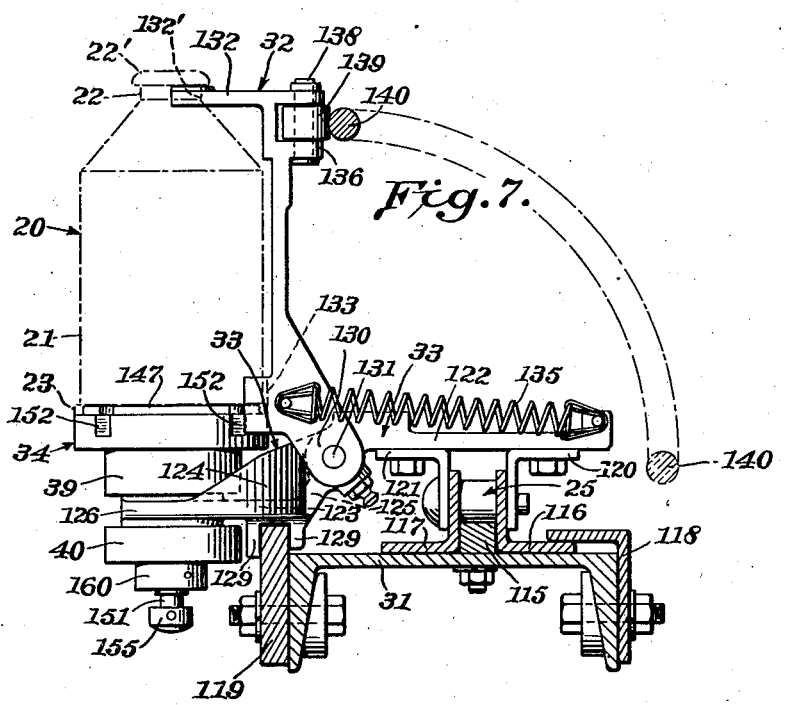
Inventors:
Wiltie I. Gladfelter,
William H. Moore,

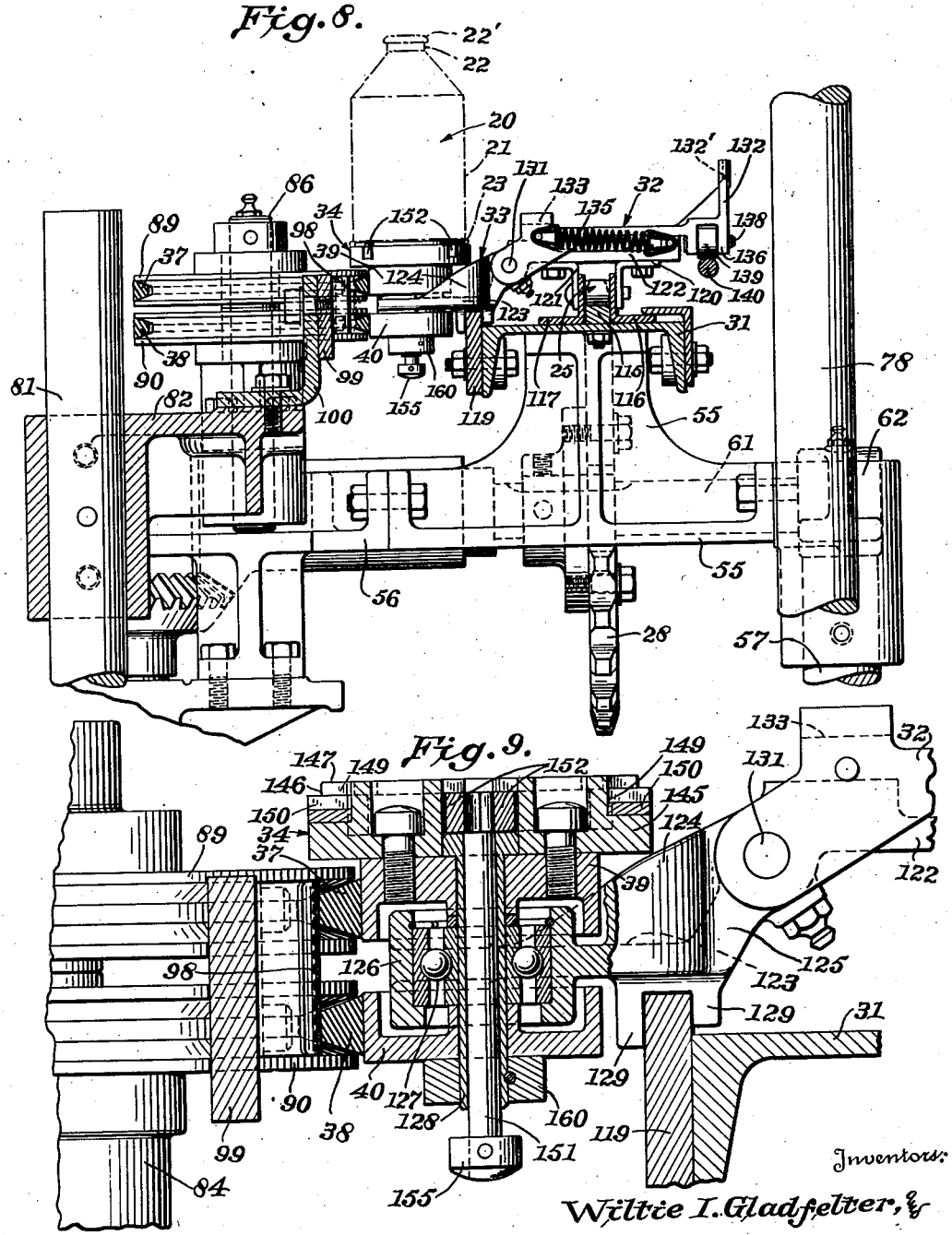

Dec. 7, 1943. W. I. GLADFELTER ET AL 2,335,931
COATING MACHINE
Filed Dec. 11, 1940 6 Sheets-Sheet 6
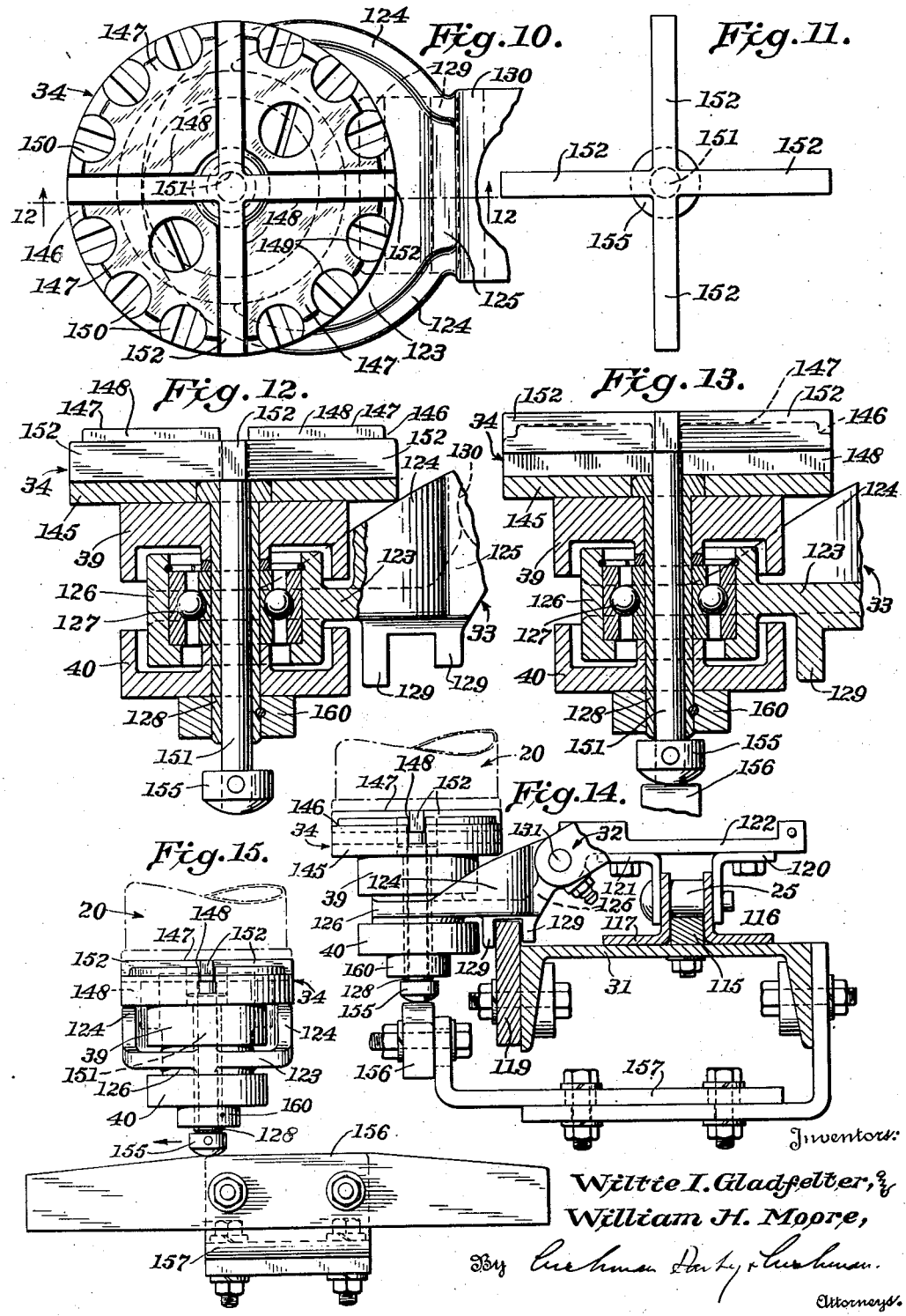

Patented Dec. 7, 1943

2,335,931

UNITED STATES PATENT OFFICE 2,335,931

COATING MACHINE

Wiltie I. Gladfelter and William H. Moore, Philadelphia, Pa., assignors to Crown Cork & Seal Company, Inc., Baltimore, Md., a corporation of New York Application December 11, 1940, Serial No. 369,674

18 Claims. (Cl. 91—45)

This invention relates to a machine for coating articles of manufacture, such as containers or cans. More particularly, the invention provides a machine adapted for use in a can manufacturing line, to coat certain portions of the cans, for instance, the conical upper ends and necks thereof.

It is an object of the invention to provide a machine that will take a line of such containers, handle the same in an expeditious manner, apply a smooth, even coating to the desired portions thereof and deliver the line of coated cans to an outfeed conveyor, leading, for instance, to a baking oven.

It is a further object of the invention to provide a machine that will handle a continuously moving line of containers having freshly coated side walls, complete the coating of the exterior surfaces thereof without marring the previously applied coating, and deliver the line of containers continuously to the next machine in the fabricating line.

A further object of the invention is to provide novel can handling istrumentalities, in a machine of the class described, adapted to receive freshly coated cans in horizontal position from a body coating machine without marring the previously applied coatings, and to deposit the containers in upright position upon rotatably mounted, vertically disposed chuck assemblies which carry the containers past additional coating devices.

It is a further object of the invention to provide novel means for rotatably supporting a line of containers and for rotating the containers about their axes as they pass a spray gun or other coating device. To this end, the invention provides rotatable can supporting chucks having magnetic devices for holding the cans thereon, together with means for positively raising the cans upwardly away from the magnetic means, to a position where they may be removed from the chucks.

A further object of the invention is to provide, in combination with other features of the machine, an out-feed dial that will remove the coated containers from the rotatably mounted chuck assemblies and deposit them upon an outfeed conveyor, without marring the freshly coated surfaces of the containers.

Other and further objects and advantages of the invention will be apparent to those skilled in the art from a consideration of the following description of the specific embodiment of the invention shown in the accompanying drawings.

In the drawings:

Figure 1 is a side elevation of the machine, with certain parts removed.

Figure 2 is a plan view of the same.

Figure 3 is an end elevation and partial section, taken substantially on line 3—3 of Figure 2.

Figure 6 is an end elevation of one of the can handling assemblies.

Figure 7 is a similar view showing certain parts in a different position.

Figure 8 is an enlarged section, taken substantially on line 8—8 of Figure 5.

Figure 9 is a vertical section and partial elevation, showing one chuck assembly and associated parts.

Figure 10 is a plan view of one can supporting chuck.

Figure 11 is a plan view of one of the elements associated with the chuck.

Figure 12 is a vertical section substantially on line 12—12 of Figure 10.

Figure 13 is a similar view, showing the parts in a different position.

Figure 14 is a vertical transverse section showing a chuck in the position approaching the discharge station, and Figure 15 is a view looking from the left of Figure 14.

Figure 4:
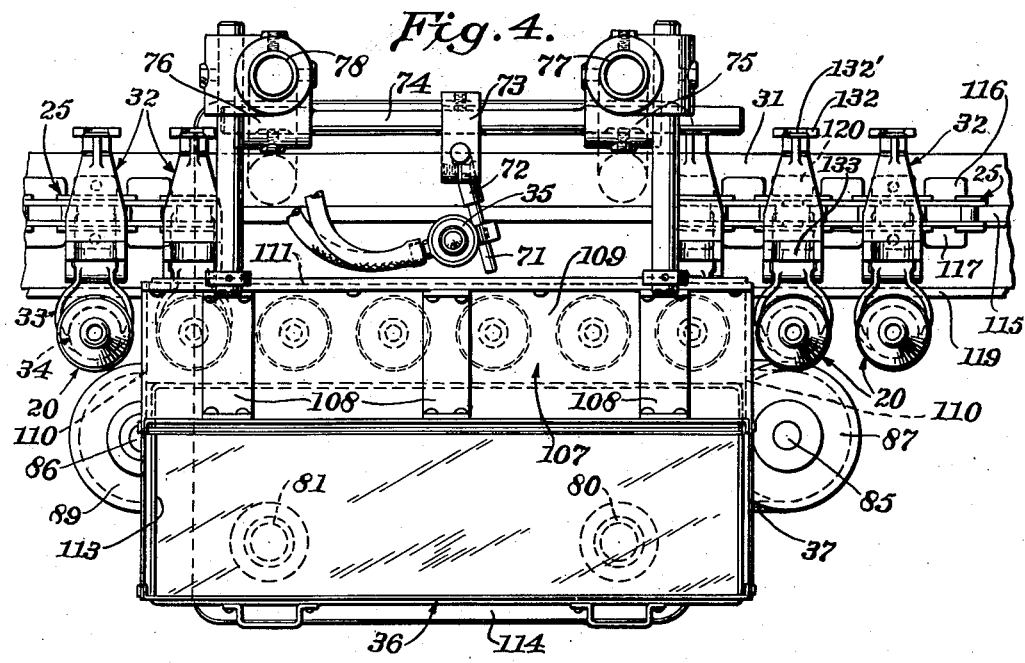
Figure 4 is an enlarged plan view of the coating section of the machine.

The machine of the present invention is adapted for use in the manufacture of drawn seamless containers, such as containers of the type shown in the application of Calleson et al., Serial No. 334,876, filed May 13, 1940. A line of such containers 20 having their cylindrical side walls 21 freshly coated, are delivered to the machine of this application from a coating machine, for instance, of the type shown in the application of Gladfelter and Moore, Serial No. 345,668, filed July 15, 1940. As explained in that application, the containers are delivered from the main turret of the machine to article receiving pockets associated with a conveyor, by which they are taken to the next machine in the line, e. g., the machine of the present application.

Such a conveyor chain 25 is trained about sprockets 26, 27, 28, 29 for movement upwardly on an inclined support 30 and then horizontally on a support 31. The pockets for receiving the containers from the roll coating machine preferably take the form of cradles 32, pivotally connected to brackets 33 carried by the chain, as hereinafter explained. Each bracket also carries a rotatably mounted chuck assembly 34 upon which the containers are deposited by the cradles and supported in vertical, upright position for rotation therewith as they are moved past a spray gun 35 in front of a hood 36. The chuck assemblies with the cans supported thereon are rotated by a pair of positively driven belts 37, 38, which frictionally engage rollers 39, 40 associated with the chucks. As a result of this rotation of the containers, the necks thereof receive even coatings from the spray gun, as they move therepast.

An outfeed dial 45, which may be substantially identical to the outfeed dial shown in the copending application of Gladfelter and Hauger, Serial No. 345,832, filed July 16, 1940, removes the coated containers from the chuck assemblies and deposits them upon an outfeed conveyor chain 46, which may lead them to oven conveyors, as explained, for instance, in the application of Gladfelter and Moore, Serial No. 347,564, filed July 25, 1940.

The sprocket 26 is preferably supported by the frame 48 of the roll coating machine, and rotation is imparted thereto by the driving means associated with that machine, not shown. Hence, the conveyor chain 25 is driven at a predetermined speed ratio to the turret of the roll coating machine, so that the cradle members 32 are properly presented to receive containers therefrom. The chain support 30 preferably comprises an inverted channel section, secured at its lower end to the roll coating machine frame 48 by a transversely extending bar 49 and, at its upper end, to brackets 50 carried by vertical posts 51, 52 supported in pedestals 53, 54. The bracket 50 also supports one end of the horizontal chain support 31, which also comprises an inverted channel, the other end thereof being carried by a bracket 55 secured at one end to the outfeed table 56 and at the other to a post 57. The outfeed table 56, in turn, is supported at the upper ends of posts 58, 59, 60, while the sprocket 28 is fast on a shaft 61 journalled at one end in a horizontal sleeve carried by the table and at the other end in a bar 62, secured to the post 57 and a second post 63. By means of appropriate gearing, partially shown in Figure 8, the outfeed dial 45 and the sprocket 64 for the outfeed conveyor chain 46 are driven at a predetermined speed ratio with respect to the sprocket 28, so that the pockets of the outfeed dial register with the containers on the chuck assemblies 34.

At a point substantially midway in the length of the chain support 31, a coating assembly is positioned, comprising hood 36, spray gun 35 and means for supporting and driving the belts 37, 38. The spray gun 35 is carried by the reduced end 71 of a laterally bent arm 72, clamped in a bracket 73 for angular adjustment about a vertical axis. The bracket 73, in turn, is clamped for longitudinal and angular adjustment on a bar 74 secured at its ends to fittings 75, 76 on the upper ends of vertical posts 77, 78. Hence, the spray gun may be universally adjusted about vertical and horizontal axes, and moved longitudinally of the bar 74. Appropriate flexible connections (not shown) for air and liquid coating material extend from a suitable source to the spray gun. Obviously, if a plurality of guns is desired, they may be similarly supported in spaced relation along the bar 74.

At the opposite side of the chain support 31, there are a pair of upwardly projecting posts 80, 81 interconnected by a brace 82 having forwardly and rearwardly projecting ends 83, 84 (Fig. 5) terminating in vertical sleeves, in which stub shafts 85, 86 are journalled for rotation. The shaft 85 adjacent its upper end carries a pair of sheaves 87, 88, having V-shaped grooves therein, and the shaft 86 carries similar sheaves 89, 90. Rotation is imparted to the shaft 85 and the sheaves 87, 88 by a gear 91 in mesh with a pinion 92 fast on the shaft 93 of an electric motor 94 carried by a bracket 95 secured to the vertical post 80. The belts 37, 38, trained about the sheaves 87, 88, 89 and 90, are urged outwardly toward the chain support 31 by a plurality of leaf-springs 98 carried by a bar 99 bolted to angle clips 100 secured to the brace 82. The motor 94 drives the sheaves 87, 88 so as to cause the operative runs of belt to move in a direction opposite to the direction of movement of the chuck assemblies 34.

Above the vertical posts 80, 81, there is positioned a hood 36 having an open upper end 105, adapted to be connected to and supported by an exhaust flue. Preferably, the entire hood assembly is suspended from above, by means not shown, although the bottom wall 106 thereof may rest upon the upper ends of the legs 80, 81. The hood is provided with a laterally and upwardly projecting portion 107, overhanging the containers passing by the spray gun 35, and reinforced by braces 108. This portion has a top wall 109, end walls 110 constituting continuations of the end walls of the hood, and a front wall 111, the hood being open below the lower edge 112 of the front wall 111. A removable pan 113 may be slidably disposed on floor 106 of the hood, for withdrawal through the back wall thereof, so that coating material which collects therein may be removed.

The legs 77, 78, 80 and 81 are all mounted in a base casting 114 and are maintained in predetermined spaced relation thereby.

The chain supporting channel members 30, 31 carry upwardly projecting track strips 115, disposed along a line substantially midway between the downwardly projecting flanges thereof. Alternate links of the conveyor chain are provided with downwardly projecting, laterally bent wings 116, 117, which constitute supporting surfaces for the chain, slidable along the supports 30, 31, the strips 115 being disposed between the wings and preventing lateral movement thereof. The outer flange of the track section 31 carries an upwardly and laterally projecting angle strip 118, positioned to overlie the wings 116 and prevent tipping of the chain laterally. A plate 119, bolted to the other flange, constitutes a track for the brackets 33.

The links of the chain alternating with the links carrying the wings 116, 117 are provided with upwardly projecting, laterally bent wings 120, 121, to which the brackets 33 are bolted or otherwise secured. Each bracket 33 comprises an upper, plate-like portion 122 secured to a pair of wings and terminating at its inner end in a depending laterally projecting platform element 123 connected thereto by arcuate reinforcing flanges 124 and an inclined web 125. The platform element 123 includes a vertically disposed hollow sleeve or boss 126 (Fig. 12), carrying antifriction bearings 127 for the spindle 128 of the associated chuck assembly 34. Below the platform portion 123, there are a pair of downwardly projecting lugs 129, defining a groove for the reception of the track 119.

The inclined web portion 125 is enlarged to provide a horizontally disposed hollow sleeve 130 for the reception of a pivot pin 131 for the cradle member 32. The latter comprises an upwardly projecting end flange 132, having an arcuate upper edge 132' adapted to engage and support the neck 22 of a container 20. At the other end, each bracket is provided with an arcuate surface 133 adapted to engage and support the double-seam 23 at the lower end of the container. It will be understood that the containers are deposited in the cradles in horizontal position by the turret of the roll coating machine, referred to above, and that the containers are supported therein with their freshly coated side walls 21 disposed out of contact with any surfaces of the cradles.

Tension springs 135, connected to pins carried by the brackets and the cradles respectively, urge the cradles downwardly to the position shown in Figure 6 at all times. Each cradle has downwardly projecting apertured lugs 136 at its outer end, carrying pin 138 and a roller 139, adapted to ride along a cam rail 140. The cam rail is provided with an upwardly and rearwardly inclined portion, serving to swing each cradle from the position shown in Figure 6 to that shown in Figure 7, whereby the cradle and the container supported therein is swung upwardly and rearwardly into alignment with the associated chuck 34 to deposit the container thereon. During this swinging movement, the container is restrained against sliding movement relative to the cradle by the edge 132' of the cradle flange 132 which is disposed in the neck groove 22 of the container, under the crown finish 22' thereof. As soon as each cradle has been moved to the position shown in Figure 7, the roller 139 encounters a downwardly inclined portion of the cam track 140, with the result that the cradle is swung downwardly and forwardly, under the influence of the spring 135, leaving the container in vertical position upon the chuck 34.

Referring to Figures 10–15, each chuck assembly 34 comprises a head 145 secured to the upper, flanged end of the hollow spindle 128, journalled in the bearings 127. The head has a marginal recess 146, providing an upwardly projecting central plug portion 147, adapted to be received within the end cavity defined by the double-seam 23 of a container. The head 145 is further provided with four upwardly facing radial grooves 148, communicating at their inner ends with the central bore of the spindle 128. As shown in Figures 9 and 10, the head is also provided with a plurality of cylindrical sockets 149 arranged circumferentially thereof, and underlying the marginal recess 146. Magnetic plugs 150 are disposed in the sockets in position to substantially contact the double-seam of a container positioned upon the chuck.

Each chuck assembly has associated therewith a can stripper comprising a pin 151 slidably mounted in the hollow spindle 128 and having laterally projecting arms 152 secured to its upper end and positioned in the grooves 148. The upper faces of the arms 152 substantially coincide with the bottom of the marginal groove 146 when in their lower-most position, and the ends of the arms are therefore disposed under the double-seam of the container positioned thereon. At its lower end, the pin 151 carries a cam following cap 155, adapted to engage a stationary cam 156 adjacent the discharge position, with the result that each pin 151 and the arms 152 carried thereby are projected upwardly to lift the can relative to the chuck and to raise the double-seam thereof above the upwardly projecting, central plug portion 147. Since the upper surfaces of the four arms 152 all lie in a common plane, the container may be removed therefrom by lateral sliding movement, by the outfeed dial 45.

The cam 156, which operates the can stripping means, is carried by a laterally projecting, two-piece bracket 157, supported by the outer flange of the track section 31, as shown in Figure 14, the two parts of the bracket being laterally adjustable, so that the cam may be positioned accurately in the path of movement of the cam followers 155.

The rollers 39, 40 for each chuck assembly are secured to the spindle 128 above and below the bearings 127 carried by the sleeve 126 of the bracket 33. The rollers and the inner race of the bearing assembly are clamped upon the spindle between the head thereof and a collar 160, or any equivalent device.

It will be understood, of course, that the rollers 39, 40 are disposed in horizontal alignment with the belts 37, 38 and that they make frictional contact therewith as they move past the sheaves 87, 88 toward the sheaves 89, 90. The belts are urged outwardly by the springs 98 into firm frictional contact with the rollers, so that the rollers, the spindles 128 and the heads 145 of the chuck assemblies are rapidly rotated about their axes.

Since the outfeed dial 45 may be substantially identical to the outfeed dial shown in the aforementioned application of Gladfelter and Hauger, Serial No. 345,832, filed July 16, 1940, it will not be described in detail. The dial is provided with a plurality of pockets defined by fixed arms 161 and movable arms 162, the respective arms being provided with pinpoint gripping devices, as explained in that application, so that, when the cans are grasped by the arms, their freshly coated side walls will not be smeared or marred. Cam means are provided for swinging the movable arms to can gripping position as the cans enter the pockets. The cans are held in this relation between the pinpoint devices, until they have been moved around in a counter-clockwise direction (Fig. 2), to a position above the chain 46, whereupon the movable arms are swung away from the cans to release the same and to permit them to move along on the chain 46, leading to an oven conveyor, or the like.

Figure 5:
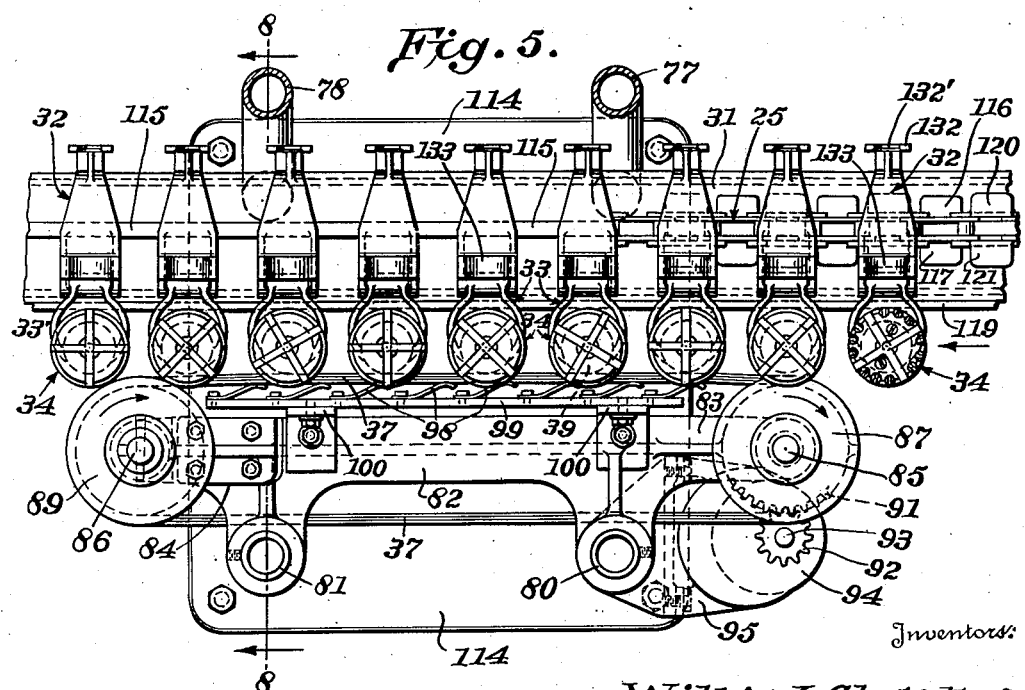
Figure 5 is a similar view, taken on a lower plane.

In the operation of the machine, containers having freshly coated side walls are delivered from the turret of a roll coating machine, for instance, of the type shown in the application of Gladfelter and Moore, Serial No. 345,668, filed July 15, 1940, into the cradles 31, as the latter begin their upward movement along the conveyor support 30. As the cradles move along the horizontal track member 31, the cam rail 140 swings the cradles from a horizontal position, upwardly to a vertical position, as shown in Figure 7, whereupon the containers are deposited upon the chucks 34, with the double-seam 23 thereof disposed in the marginal recesses 146 thereof and with the plug portions 147 projecting into the end cavities defined by the double-seams, the containers being held firmly thereon by the circumferentially arranged magnets 150. After the cans have been so deposited on the chucks, the rollers 39, 40 associated with the chuck assemblies, move into contact with the belts 37, 38, which are driven in a direction opposite to the direction of movement of the conveyor chain. Hence, the chucks and cans, as they move by the spray gun, are rapidly rotated in a counter-clockwise direction (Figs. 2, 4 and 5). The gun is aimed so as to project a spray of coating material upon the conical upper ends and necks of the rapidly rotating containers, as they move therepast.

As the chucks approach the outfeed dial 46, the stationary cam 156 raises the stripper pin 151 and the arms 152, thereby lifting the double-seams of the cans to a position above the raised, plug portions 147 of the chucks. Hence, the cans are in position to be moved laterally over the upper surfaces of arms 152 by the grippers associated with the outfeed dial 45. The containers are transferred to the chain 46, as previously described, and are then deposited upon conveyors which lead them through a baking oven or the like.

Although the invention has been described with considerable particularity, it must be understood that it is not limited to the details of construction shown in the accompanying drawings and described above, but covers all devices coming within the scope of the appended claims and their equivalents.

We claim:

1. In a coating machine, a conveyor having a plurality of brackets secured thereto and provided with means for rotatably supporting articles to be coated, separate article receiving members pivoted to the brackets and adapted to receive articles in one position spaced from said article supporting means, and means for swinging the members relative to the brackets during movement of the conveyor to deposit the articles in a different position upon said article supporting means.

2. In a machine for coating articles, coating means, a conveyor trained for movement past said means and having a plurality of brackets secured thereto, each provided with means for supporting the articles in position to be coated, an article receiving cradle pivoted to each bracket and adapted to receive an article in a different position, and means for swinging the cradles relative to the brackets as they approach the coating means, to deposit the articles upon said supporting means in the first-mentioned position.

3. In a machine for coating articles, coating means, a conveyor trained for movement past said means and having a plurality of brackets secured thereto, rotatably mounted article supporting devices carried by the brackets and adapted to hold the articles in position to receive coating material from said means, article receiving cradles pivoted to the brackets and adapted to receive articles in a different position, and means for swinging the cradle members relative to the brackets during their movement with the conveyor, to deposit the articles upon the supporting devices in the first-mentioned position.

4. In a machine for coating containers, relatively fixed coating material spraying means, a conveyor trained for movement therepast and having a plurality of brackets carried thereby, rotatably mounted, vertically disposed, container receiving chucks carried by the brackets, horizontally disposed container receiving cradles pivoted to the brackets in alignment with the chucks, means for depositing containers in horizontal relation in the cradles, means for swinging the cradles and the containers to vertical position in alignment with the chucks to deposit the containers thereon, and means for rotating the chucks and the containers as they pass said spraying means.

5. In a machine for coating articles, comprising coating material spraying means, a conveyor chain trained for movement past said means, a plurality of brackets secured to the chain and extending transversely with respect thereto, vertically disposed chucks journalled for rotation in the ends of the brackets at one side of the chain, horizontally disposed article receiving cradles pivoted to the brackets and normally disposed above the chain, means for swinging the cradles during their movement with the chain upwardly and laterally to a vertical position aligned with the chucks, thereby to deposit the containers in vertical position upon the chucks, and means for rotating the chucks as they pass said spraying means.

6. In a machine for coating articles, comprising coating material spraying means, a conveyor chain trained for movement past said means, a plurality of brackets secured to the chain and extending transversely with respect thereto, vertically disposed chucks journalled for rotation in the ends of the brackets at one side of the chain, horizontally disposed article receiving cradles pivoted to the brackets and normally disposed above the chain, spring means for urging the brackets to that position, stationary cam means for swinging the cradles during their movement with the chain upwardly and laterally to a vertical position aligned with the chucks, thereby to deposit the containers in vertical position upon the chucks, and means for rotating the chucks as they pass said spraying means.

7. A machine for coating containers of the type having cylindrical side walls, double-seams at their lower ends, and frusto-conical upper ends terminating in necks of reduced diameter, comprising a plurality of brackets movable along a predetermined path past a coating station, vertically disposed chucks journalled for rotation in the brackets and having their upper ends shaped to enter the end cavities defined by said double-seams to support the containers in upright position, cradles pivoted to the brackets and having arcuate surfaces adapted to engage the double-seams and the reduced necks of the containers to support them in horizontal position with their side walls out of contact, and means for swinging the cradles during said movement of the brackets to a vertical position, to deposit the containers upon the chucks.

8. A can coating machine comprising coating material spray means, a conveyor chain trained for movement therepast, brackets secured to the chain, a plurality of vertically disposed can supporting chucks journalled for rotation in the brackets and having upper ends shaped to fit within the seaming flanges at the ends of the cans, means for depositing the cans in upright position upon the chucks, means for rotating the chucks as they pass the spray means, means associated with the chucks for engaging under the double-seams of the cans and raising them above the chucks, and means for moving the raised cans therefrom.

9. In a can coating machine, means for rotatably supporting a can in vertical position to receive coating material from a spray gun, comprising a bracket, a spindle journalled for rotation on a vertical axis therein, a head carried by the spindle having an upwardly projecting plug portion adapted to enter the end cavity defined by the double-seam at the lower end of the can, a plurality of arms associated with said head projecting laterally under said double-seam, and means for raising the arms to raise the can and to lift the double-seam thereof above said plug portion, whereby the can may be moved therefrom by lateral movement.

10. In a can coating machine, means for rotatably supporting a can in vertical position to receive coating material from a spray gun, comprising a bracket, a hollow spindle journalled for rotation on a vertical axis therein, a head carried by the spindle having an upwardly projecting plug portion adapted to enter the end cavity defined by the double-seam at the lower end of the can, a pin slidably disposed in the hollow spindle and having radial arms projecting under said double-seam, and cam following means carried by the lower end of the pin for raising the pin and said arms to lift the double-seam of the can above said plug portion, whereby the can may be removed therefrom by lateral movement.

11. A can supporting chuck assembly for use in a can coating machine, comprising a hollow spindle journalled for rotation on a vertical axis, a can supporting head at the upper end of the spindle having radial grooves in its upper face and a plug portion adapted to be received in the cavity defined by the double-seam at the lower end of a can, a pin slidably mounted in the spindle and carrying a plurality of radially projecting arms disposed in said grooves and underlying the double-seam of a can supported by the head, and means for raising the pin and the arms to lift the double-seam above the plug portion of the head.

12. A can supporting chuck assembly for use in a can coating machine, comprising a hollow spindle journalled for rotation on a vertical axis, a head carried by the upper end of the spindle and having radial grooves in its upper face, a plurality of magnetic inserts arranged circumferentially of the head and positioned to substantially engage the double-seam of a can supported thereon, a pin slidable in said spindle and having a plurality of radially disposed arms secured thereto and disposed in said grooves, and means for raising the pin and said arms to lift the container from said magnets.

13. A can supporting chuck assembly for use in a can coating machine, comprising a rotatably mounted, vertically disposed hollow spindle, a head at the upper end of said spindle having a central plug portion defined by a marginal recess adapted to receive the double-seam at the end of a can with the plug disposed in the cavity inwardly of the double-seam, a plurality of magnets in the bottom of said marginal recess adapted to substantially engage the double-seam to hold the can on the head, movable elements carried by the head and disposed under the double-seam in that position, and means for raising said elements to lift the double-seam away from said magnets and above the plug portion.

14. A can supporting chuck assembly for use in a can coating machine comprising vertically disposed, rotatably mounted, hollow spindle having a head at its upper end, said head having an upwardly projecting, central plug portion defined by a marginal recess and having radial grooves in its upper face communicating at their inner ends with the hollow interior of the spindle, a vertically movable pin in the spindle, and a spider disposed in said radial grooves.

15. A coating machine comprising a spray gun, a conveyor chain trained for movement past the gun, brackets carried by the chain and a can holding chuck carried by each bracket, each chuck comprising a vertically disposed spindle journalled between its ends in the bracket, a can supporting head at the upper end of each spindle, a pair of rollers fast on the spindle above and below the journal connection with the bracket, means adjacent the spraying means for frictionally engaging the rollers and for rotating the heads and the cans supported thereon, and means operative thereafter for raising the cans above said heads.

16. A container coating machine comprising a conveyor chain trained for movement along a predetermined path, a spray gun at one side of the chain, a hood at the opposite side thereof positioned to receive excess spray from the gun, a plurality of brackets carried by the conveyor chain, cradles pivoted to the brackets and adapted to receive containers in horizontal position, vertically disposed chuck assemblies journalled in the brackets and having friction rollers associated therewith, means for swinging the cradles and the containers therein from said horizontal position to a vertically position in alignment with the chucks to deposit the containers thereon, belt means trained for movement along a path adjacent the hood and spray gun and adapted to be frictionally engaged by said rollers, and means for driving the belt means, thereby to rotate the chuck assemblies and the containers.

17. A machine for coating the necks and conical upper end portions of containers having freshly coated cylindrical side walls and double-seams at their lower ends, comprising cradles adapted to receive the containers in horizontal position and to support the same by contact with the double-seams and neck ends only, a plurality of vertically disposed chuck assemblies associated with the cradles, means for swinging the cradles to a vertical position to deposit the containers in upright relation thereon, a spray gun, means for moving the chuck assemblies to cause the neck ends of the containers to pass through the spray projected by the gun, means for rotating the assemblies and the containers during such movement, and an outfeed dial having arms provided with pin-point contact members adapted to grasp the side walls of the containers and to move them from the chuck assemblies.

18. A machine for coating the necks and conical upper end portions of containers having freshly coated cylindrical side walls and double-seams at their lower ends, comprising cradles adapted to receive the containers in horizontal position and to support the same by contact with the double-seams and neck ends only, a plurality of vertically disposed chuck assemblies associated with the cradles and having plug portions adapted to enter the cavities defined by the double seams at the bottom end of the containers, means for swinging the cradles to a vertical position to deposit the containers in upright relation on said plug portion, a spray gun, means for moving the chuck assemblies to cause the neck ends of the containers to pass through the spray projected by the gun, means for rotating the assemblies and the containers during such movement, means for raising the double seams of the containers above said plug portions, and an outfeed dial having arms provided with pin-point contact members adapted to grasp the side walls of the containers and to move them laterally from the chuck assemblies.

WILTIE I. GLADFELTER.
WILLIAM H. MOORE.